(12) United States Patent
Henry et al.

(10) Patent No.: US 9,572,296 B2
(45) Date of Patent: Feb. 21, 2017

(54) REMOTE LEVELING OF TILLAGE IMPLEMENTS

(71) Applicant: CNH Industrial Canada, Ltd., Saskatoon (CA)

(72) Inventors: James W. Henry, Saskatoon (CA); Tracey D. Meiners, Mackinaw, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 148 days.

(21) Appl. No.: 14/566,102

(22) Filed: Dec. 10, 2014

(65) Prior Publication Data
US 2015/0156952 A1    Jun. 11, 2015

Related U.S. Application Data

(60) Provisional application No. 61/914,529, filed on Dec. 11, 2013.

(51) Int. Cl.
*A01B 63/22* (2006.01)

(52) U.S. Cl.
CPC .................... *A01B 63/22* (2013.01)

(58) Field of Classification Search
CPC ..... A01B 63/002; A01B 63/008; A01B 63/10; A01B 63/14; A01B 63/22
USPC ........................................ 172/663, 664, 668
See application file for complete search history.

(56) References Cited

U.S. PATENT DOCUMENTS

| | | | |
|---|---|---|---|
| 4,600,060 A * | 7/1986 | Winter | A01B 63/32 172/4 |
| 4,809,786 A | 3/1989 | Hoehn et al. | |
| 5,041,784 A | 8/1991 | Griebeler | |
| 5,957,218 A | 9/1999 | Noonan et al. | |
| 6,509,733 B2 | 1/2003 | Blubaugh et al. | |
| 7,116,097 B2 | 10/2006 | Revankar et al. | |
| 7,259,553 B2 | 8/2007 | Arns, Jr. et al. | |
| 7,280,937 B1 | 10/2007 | Greer et al. | |
| 7,686,095 B2 * | 3/2010 | Batthala | A01B 63/1117 172/2 |
| 7,982,459 B2 | 7/2011 | Killian et al. | |
| 8,100,045 B2 | 1/2012 | Osborn et al. | |
| 8,544,397 B2 * | 10/2013 | Bassett | A01C 7/205 111/135 |
| 8,544,398 B2 * | 10/2013 | Bassett | A01C 7/205 111/135 |
| 8,763,713 B2 * | 7/2014 | Bassett | A01O 5/06 111/135 |
| 8,776,702 B2 * | 7/2014 | Bassett | A01C 7/205 111/135 |

(Continued)

*Primary Examiner* — Gary Hartmann
(74) *Attorney, Agent, or Firm* — Rebecca L. Henkel; Rickard K. DeMille

(57) ABSTRACT

An agricultural implement for supporting a plurality of gangs of disk blades extending generally laterally relative to a forward travel direction. The implement has carrier frames pivotally connected to wheel assemblies for controlling the height of the carrier frames relative to the ground through hydraulic actuators acting on the wheel assemblies. The hydraulic control unit enables independent and individual control of each actuator. An electronic control unit (ECU) receives displacement signals from the actuators and stores the signals when the agricultural implement is on a reference surface for synchronized set points. Thereafter any deviation from the synchronized set point is corrected.

20 Claims, 5 Drawing Sheets

(56) References Cited

U.S. PATENT DOCUMENTS

| | | | |
|---|---|---|---|
| 8,985,232 B2* | 3/2015 | Bassett | A01C 7/205 111/135 |
| 9,055,712 B2* | 6/2015 | Bassett | A01B 61/044 |
| 9,107,337 B2* | 8/2015 | Bassett | A01B 71/02 |
| 9,107,338 B2* | 8/2015 | Bassett | A01B 71/02 |
| 9,232,687 B2* | 1/2016 | Bassett | A01B 61/044 |
| 9,301,438 B2* | 4/2016 | Sauder | F15B 11/042 |
| 9,301,439 B2* | 4/2016 | Gilstring | A01B 49/027 |
| 9,307,688 B2* | 4/2016 | Adams | A01C 7/203 |
| 9,363,939 B2* | 6/2016 | Henry | A01B 63/22 |
| 2004/0016556 A1 | 1/2004 | Barber | |
| 2013/0213676 A1* | 8/2013 | Bassett | A01C 7/205 172/260.5 |
| 2013/0319698 A1* | 12/2013 | Adams | A01C 7/203 172/4 |
| 2014/0156154 A1* | 6/2014 | Ryder | A01B 63/32 701/50 |
| 2015/0073668 A1* | 3/2015 | Achen | A01B 49/04 701/50 |
| 2015/0156948 A1* | 6/2015 | Henry | A01B 63/22 172/1 |
| 2015/0156950 A1* | 6/2015 | Henry | A01B 51/04 172/1 |
| 2015/0156951 A1* | 6/2015 | Henry | A01B 63/22 172/664 |
| 2015/0264857 A1* | 9/2015 | Achen | A01B 49/06 111/149 |
| 2015/0373901 A1* | 12/2015 | Bassett | A01C 7/205 172/1 |
| 2016/0100517 A1* | 4/2016 | Bassett | A01B 61/044 172/1 |

* cited by examiner

REMOTE LEVELING OF TILLAGE IMPLEMENTS

CROSS REFERENCE TO RELATED APPLICATIONS

This is a non-provisional application based upon U.S. provisional patent application Ser. No. 61/914,529, entitled "REMOTE LEVELING OF TILLAGE IMPLEMENTS", filed Dec. 11, 2013, which is incorporated herein by reference.

BACKGROUND OF THE INVENTION

1. Field of the Invention

The present invention relates to farm implements, and, more particularly, to systems and methods for maintaining such implements level relative to the soil.

2. Description of the Related Art

In the continuing quest for providing greater efficiency in the operation of farm implements, machines have been constructed to have ever increasing lateral spans relative to a tractor or central unit propelling the unit over a field. When the span increases to realize greater efficiency and speed, the criteria of having a uniform and level tool contact with the soil becomes extremely critical. Equipment with significant lateral spans have many different joints and are usually articulated to enable transport to and between fields.

An area of special importance to level positioning of farm implements is found in the tillage field. The desirable outcome is a uniform physical depth of the tillage and a uniform entry of the disk blades or harrows into the soil. The need to have a level positioning of the implement is made more challenging with the use of hydraulic actuators which control the depth of penetration of the disk blades or other tools. In current practice, hydraulic actuators are connected in series and it is possible through normal operation for hydraulic fluid leakage to make the actuators out of sync with one another. In addition, field conditions, such as wheel loading and other variables, require an adjustment to the synchronization of the different sections of the tillage implement, thereby requiring the operator to dismount from a tractor and make manual adjustments.

It is current practice to partially counter this occurrence by fully elevating the implement to the point where bypass lands in the actuators allow full flow of hydraulic fluid to pass through the actuators and again synchronize the multiple units. However, this adds an additional step to the operation, particularly in the field, thereby decreasing the efficiency and speed with which the particular task is accomplished.

What is needed in the art therefore, is an efficient apparatus and method for maintaining agricultural implements in a level position relative to the soil.

SUMMARY OF THE INVENTION

An advantage of the present invention is a more accurate and efficient synchronization of multiple sections of a farm implement.

In one form, the invention is an agricultural implement spanning a lateral distance relative to a forward direction. The implement has a plurality of interconnected carrier frames, each for supporting a plurality of soil engaging tools. At least one supporting element is carried by each carrier frame for variably positioning the carrier frame relative to the soil. An actuator has a base and a variably extending elongated element connected between each supporting element and the respective carrier frame for varying the position of the respective carrier frame relative to the soil. A sensor determines the displacement of the elongated element relative to the base of each of the actuators. An actuator control unit is provided for each actuator to move the actuator independently in response to a signal input. An electronic control unit "ECU" receives a desired input signal and compares it to the signal from the sensor to send a resulting signal to the actuator control unit for varying the position of each elongated element to reach the desired signal input for the system.

In another form, the invention is a method of leveling an agricultural implement relative to the soil with the agricultural implement including a plurality of articulated carrier frames, each for supporting a plurality of soil engaging tools and having at least one supporting element carried by the carrier frame for variably positioning the carrier frame relative to the soil. An actuator is provided for each supporting element with the actuator having a base and variably elongated element connected between the supporting elements and the carrier frame for setting the position of the carrier frame relative to the soil. The method includes the steps of determining a set point for displacement of each carrier frame relative to the soil at the respective supporting element, individually determining the displacement of the elongated element relative to the base of the sensor and comparing the set point and the actual displacement of the actuator to apply individually a correcting signal to level the carrier frame.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention and such exemplification is not to be construed as limiting the scope of the invention in any manner.

DETAILED DESCRIPTION OF THE INVENTION

Figure 1:
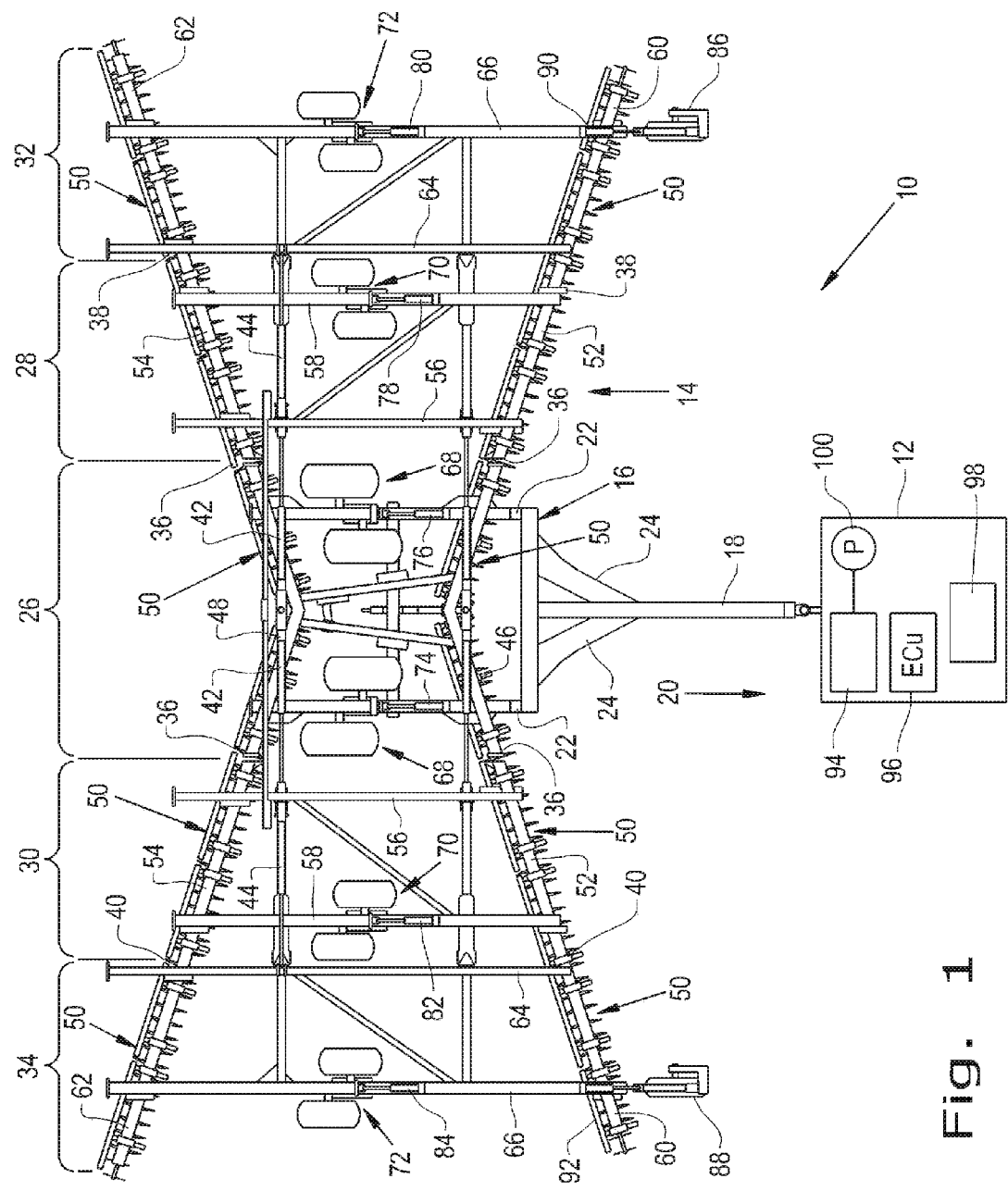
FIG. 1 illustrates a tillage implement including a support of disk blades embodying the present invention, being pulled by a tractor shown in schematic fashion.

Referring now to the drawings, and more particularly to FIG. 1, there is shown a tillage apparatus 10 which generally includes a tractor 12 shown schematically and an agricultural tillage implement 14 for tilling the soil prior to seeding. It should be noted that many different tools may be employed with the tillage implement 14 beyond the embodiment shown.

Agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft oriented carrier frame members 22 which are coupled with and extend from pull hitch 18. Reinforcing gusset plates 24 may be used to strengthen the connection between pull hitch 18 and carrier frame members 22.

Figure 5:
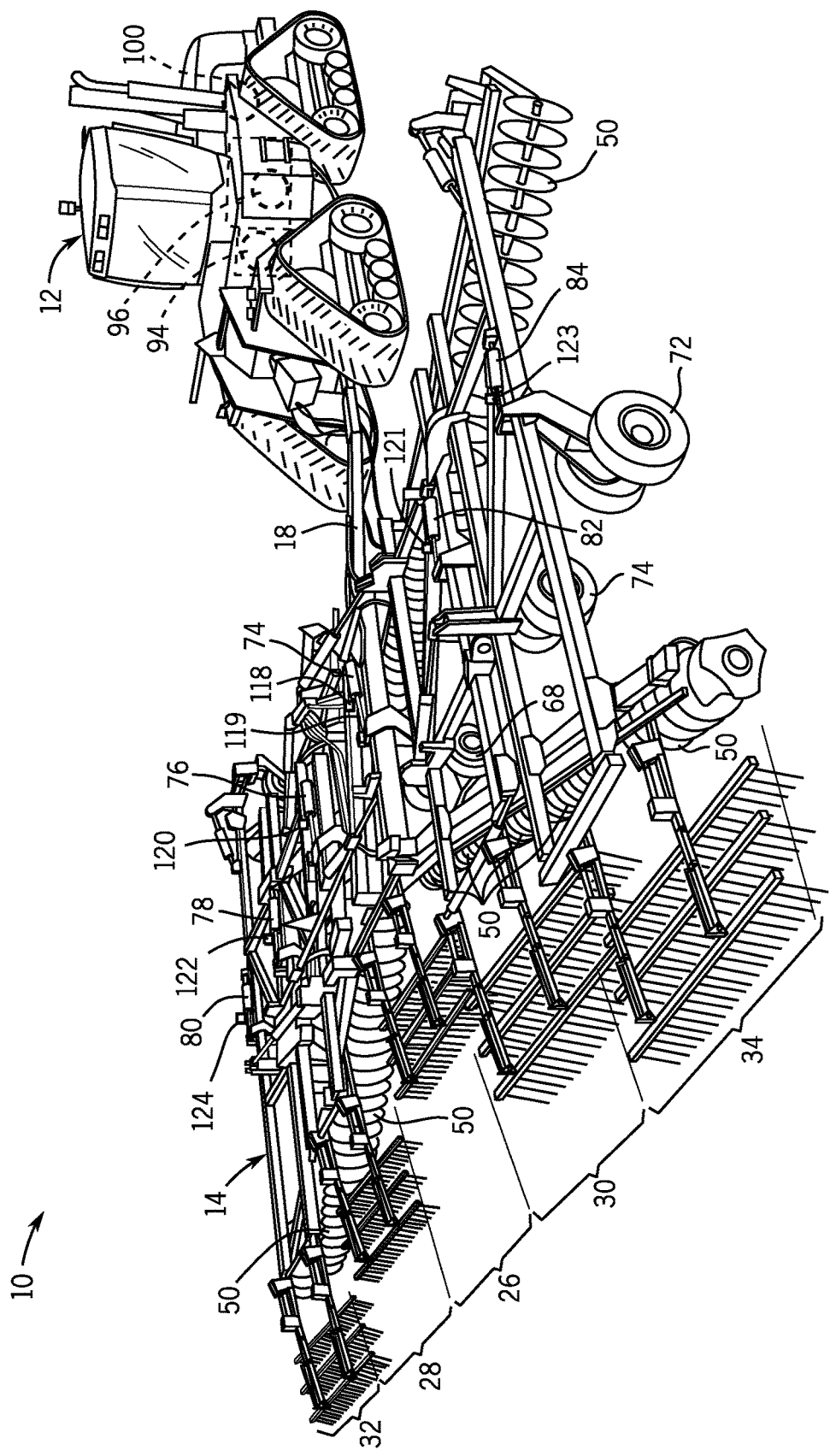
FIG. 5 is a perspective view, illustrating the frame sections, some of the supporting elements, the actuators, and the sensors of the present invention.

The tillage implement 14 has a center section 26, an inner right wing section 28 and an outer right wing section 32 as viewed in FIG. 1 and FIG. 5. A left inner wing section 30 connects with a left outer wing section 34. The center section 26 is pivotally connected to the inner wings 28 and 30 by pivotal interconnections at 36. The right inner wing section 28 and right outer wing section 32 are pivotally interconnected at 38. The left inner wing section 30 and outer left wing section 34 are interconnected at pivotal joints 40. The details of the pivotal joints are omitted to enable a clearer understanding of the present invention. However, it should be understood that the pivotal connections allow articulation of the various sections between a field position in which each of the sections are substantially in a common plane and a transport position in which the outer wing sections 32 and 34 are folded, as well as the inner wing sections 28 and 30, to enable sufficient road clearance.

Actuator assemblies 42 are connected between the center section 26 and inner wing sections 28 and 30 to enable pivoting between the field and transport position. Actuator assemblies 44 are interconnected between right inner wing section 28 and outer right wing section 32 as well as inner left wing section 30 and outer wing section 34 to enable the pivoting movement.

The center section 26 has a forward frame member 46 extending across carrier frames 22 and secured thereto. Center section 26 additionally has an aft frame member 48 structurally interconnected with carrier frames 22 at their aft end. As is noted, the frame elements 46 and 48 extend generally laterally with respect to the direction of movement 20 of the agricultural implement. Frame members 46 and 48, however, extend at an angle as is known in the tillage art to produce appropriate working of the soil. The frame members 46 and 48 provide support beneath them for gangs of disc blades 50. The gangs of disc blades 50 are resiliently connected to the frame elements in appropriate fashion to provide smooth working of the soil.

The inner wing sections 28 and 30 each have a forward frame member 52 and an aft frame member 54. These frame members are interconnected by forward and aft oriented inner frame members 56 and outer frame members 58. The forward and aft frame members 52 and 54 form an extension of forward and aft frame members 46 and 48. The forward and aft frame members 52 and 54 each also support gangs of disc blades 50.

The outer wing sections 32 and 34 each have forward and aft frame members 60 and 62 which each support gangs of disk blades 50. Frame members 60 and 62 are interconnected by inner frame members 64 and outer frame members 66.

As illustrated in FIGS. 1 and 5, the various sections 26, 28, 30, 32 and 34 of the tillage implement 14 are positioned at variable positions relative to the soil and thus set the position of the gangs of disk harrows 50 above the soil and the depth they cut into the soil. As illustrated, variable support elements for the sections are shown as wheel sets but it should be understood that other forms of variable support may be employed. As illustrated, wheel sets 68 are pivotally interconnected with carrier frames 22 so that they provide support to the forward and aft frame members 46 and 48 relative to the soil. Wheel sets 70 are interconnected with frame element 58 to support and variably position inner wing sections 28 and 30 relative to the soil. In addition, wheel sets 72 are pivotally mounted on frame members 66 to support and variably position outer wing sections 32 and 34 at a variable distance relative to the soil. Actuators 74 and 76 manipulate wheel sets 68 to establish the distance of center section 26 relative to the soil. Actuators 78 and 80 support and variably position sections 28 and 32 relative to the soil. Finally, actuator assemblies 82 and 84 support and variably position sections 30 and 34 relative to the soil.

In addition, castor wheel assemblies 86 on section 32 and 88 on section 34 orient the for and aft angle of the tillage implement 14 relative to the soil. Actuators 90 and 92 are employed for this purpose.

The actuators described above are shown as hydraulic and for this purpose a hydraulic control unit 94 is mounted in the tractor 12 and has a pump 100 for pressurizing hydraulic fluid to control the actuators. The hydraulic control unit 94 receives inputs from an electronic control unit (ECU) 96 which receives various inputs set out below, in addition to an operator input through control unit 98.

Figure 2:
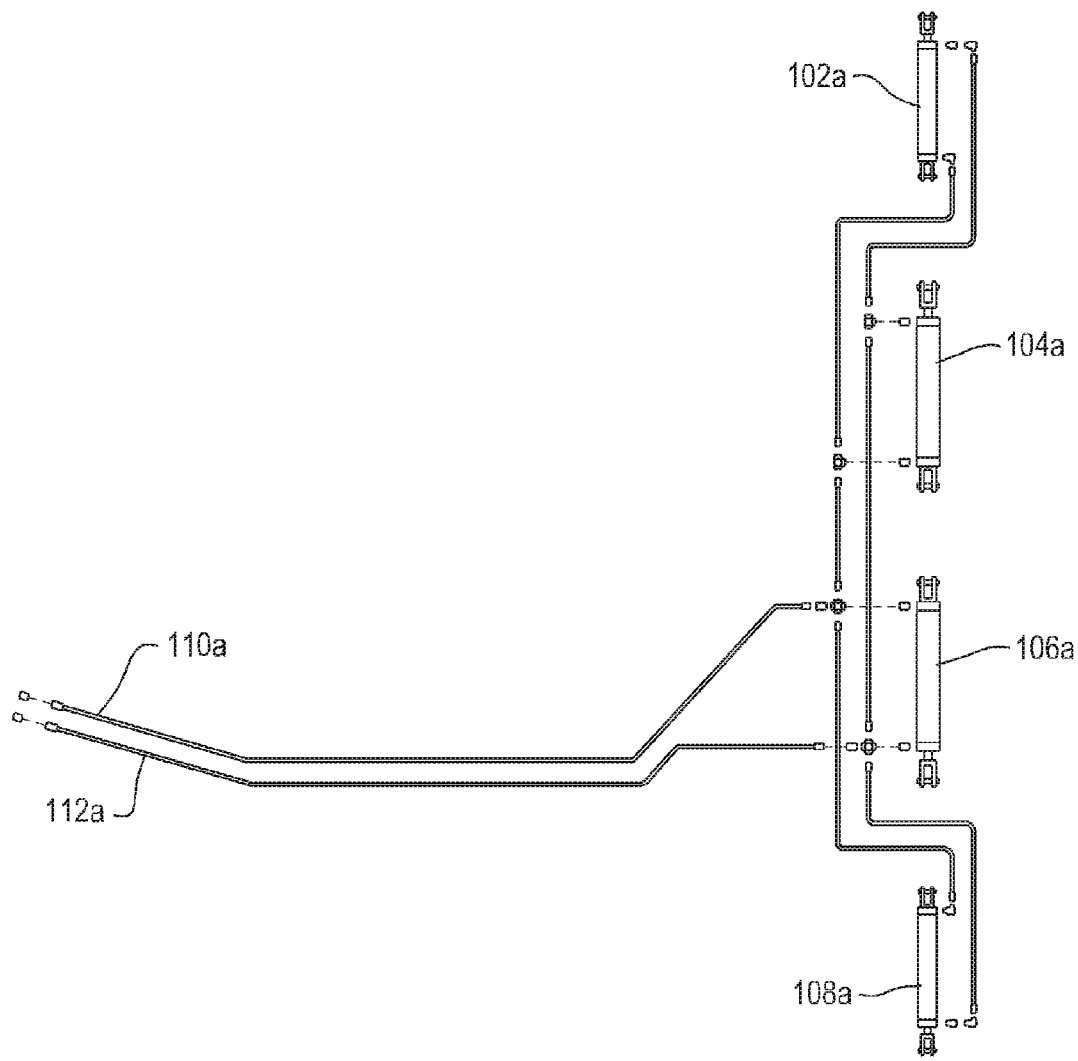
FIG. 2 is a plan view of a hydraulic system shown in the prior art for the tillage implement of FIG. 1.

The hydraulic interconnection established by a typical prior art system for elevating the various sections of the tillage implement 14 is shown in FIG. 2. In this arrangement, each of a set of actuators 102a, 104a, 106a and 108a is connected to a hydraulic control pressure source by supply conduits 110a and 112a. As is illustrated in FIG. 1 the actuators 102a-108a are connected in parallel so that the pressure uniformly applies to each actuator in the set. As described above however, the actuators may become out of sync due to linkage past a piston thus requiring additional steps in the field to ensure synchronization of the actuators.

Figure 3:
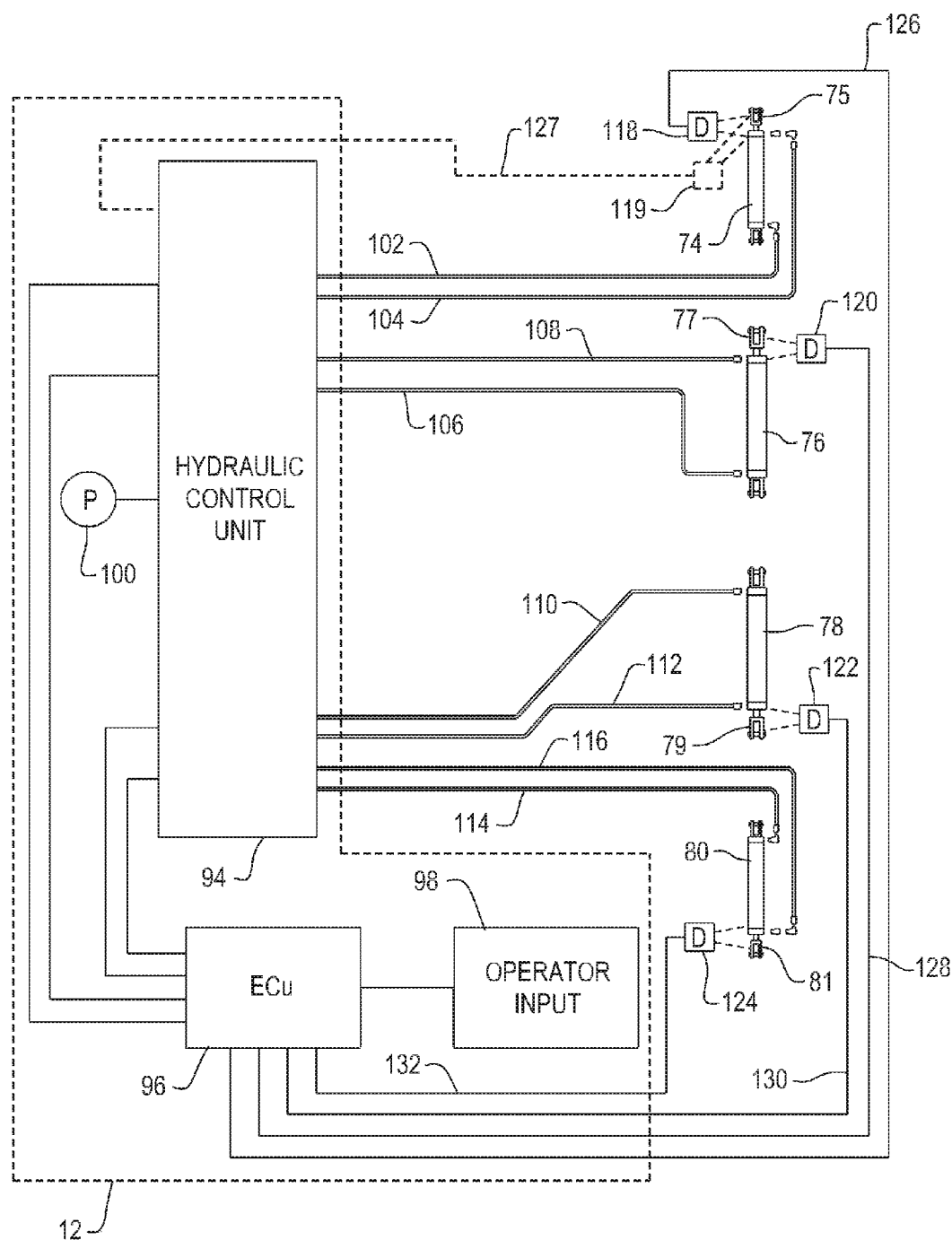
FIG. 3 is a plan view of a hydraulic system for the tillage implement of FIG. 1.

In accordance with the present invention, a control system and method set forth in FIG. 3 overcomes these difficulties. FIG. 3 shows actuators 74, 76, 78 and 80. The operation of the additional actuators is similar and is omitted to enable a better understanding of the present invention. Each of the actuators 74, 76, 78 and 80 has an output shaft 75, 77, 79 and 81, respectively extending from the actuator body. Each actuator has a piston displaceable within a chamber in the actuator body and connected to the respective output shaft.

The piston end of the actuator 74 is connected to the hydraulic control unit 94 by a hydraulic line 102. The output shaft end of actuator 74 is connected to the hydraulic control unit 94 by a return line 104. In similar fashion, the piston end of actuator 76 is connected by line 106 and a return line 108 is provided to control unit 94. The piston end of actuator 78 is connected to hydraulic control unit 94 by line 110 and the return line is designated as 112. Finally, the piston end of actuator 80 is connected to hydraulic control unit 94 via hydraulic line 114 and a return line 116 is provided. The independent connection of the actuators to the hydraulic control unit 94 will enable independent establishment of the height of the units relative to the soil.

The relative physical position of the hydraulic control unit 94 may be different than the one shown in FIG. 3, depending up on the application for the unit. It may be a single module or may be provided in individual control sections with at least several of the hydraulic actuators connected hydraulically in series. However the hydraulic control unit 94 is positioned relative to the actuators, it permits independent manipulation of the actuator output shafts as will be described below.

For this purpose, a displacement detecting device is provided to provide a signal proportional to the displacement of each output shaft relative to the body of the respective actuator. Alternatively, a displacement detecting device may be employed to provide a signal reflecting the position of the carrier frame relative to the soil at the frame supports. In addition to the displacement signal, a signal reflecting the rate of change of displacement or $\Delta D/\Delta T$ is provided. As shown in FIG. 3, the displacement indicating devices are identified as 118 for actuators 74, 120 for actuators 76, 122 for actuator 78 and 124 for actuator 80. As illustrated in FIG. 5, those actuators 74, 76, 78 and 80 and their respective displacement devices 118, 120, 122 and 124 are shown. In addition the displacement indicating devices are identified as 121 for actuator 82 and 123 for actuator 84. The displacement indicating devices 118, 120, 122 and 124 provide signal inputs to the ECU via lines 126, 128, 130 and 132, respectively. Similarly, it will be understood that displacement indicating devices 121 and 123 also will provide signal inputs to the ECU via lines (not shown). The displacement indicating devices are devices that provide appropriate control signals that are proportional to the displacement of the output shaft relative to the various actuators and preferably the rate of change of displacement. The interconnections with the output shafts and actuators are not included to enable a better focus on the basic principle of the invention. Any one of a number of sensors may be employed for this purpose.

As shown in FIGS. 3 and 5, the displacement sensors and $\Delta D/\Delta T$ sensors are incorporated into a single unit. However, the $\Delta D/\Delta T$ signal may be provided in a separate unit 119 shown in dashed lines for actuator 74. Unit 119 may be connected to ECU 96 by a line 127, also shown as a dashed line. Similar units would be provided for actuators 76, 78, 80, 82, and 84 if it is desired to use separate units for displacement and $\Delta D/\Delta T$ signals.

Figure 4:
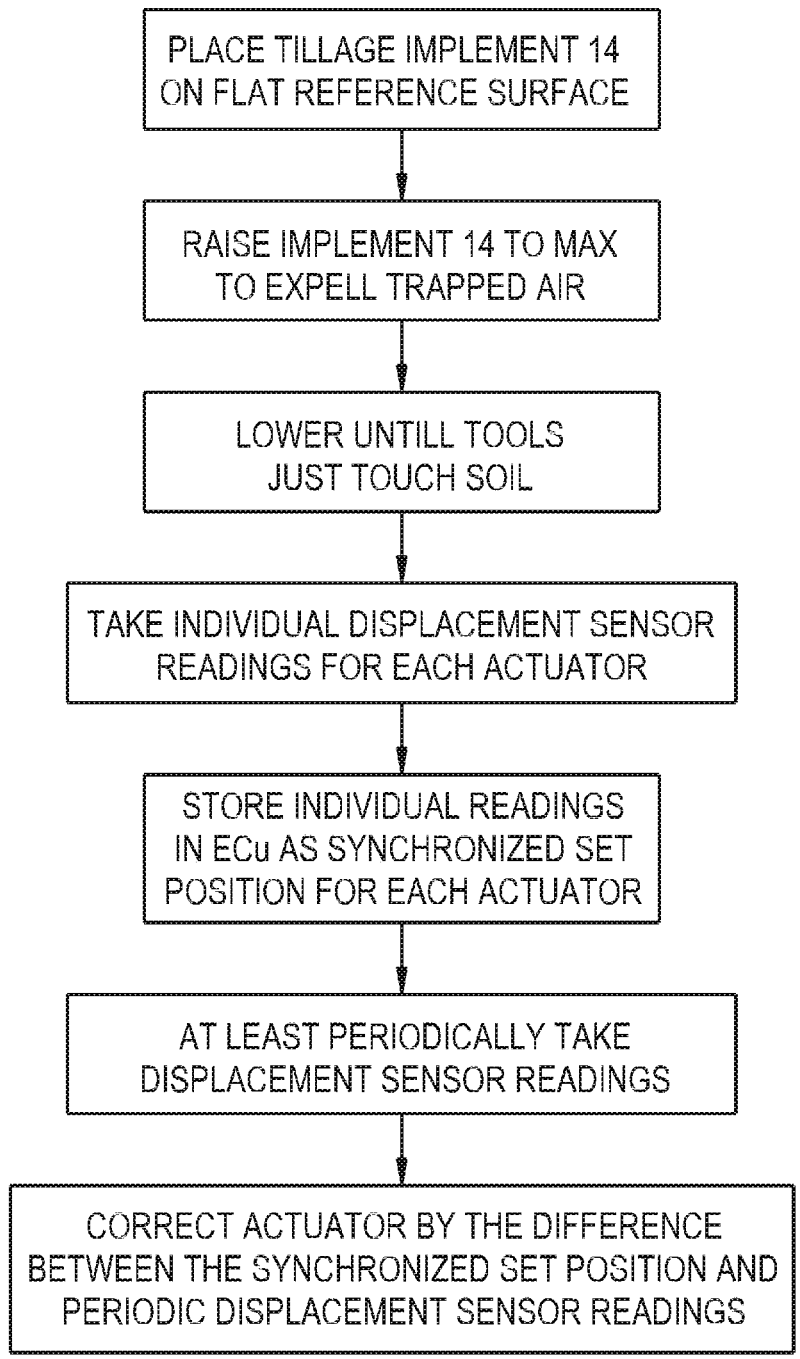
FIG. 4 is a block diagram of the method embodying the present invention.

Referring to FIG. 4, the invention is applied to the tillage implement of FIG. 1 by initially setting the implement on a level surface for calibration. The implement 14 is raised to the maximum extent where each individual actuator has its output shaft at its maximum length. At this point, a bypass port in the piston provides a bypass for return flow back to the actuator control unit 94. This ensures that any air entrained in the system due to assembly or other reason is passed to the hydraulic system. The implement 14 is then lowered so that the tools, in this case the gangs of disk blades 50, just touch the level surface. Preferably this surface would be a level concrete surface. Once the actuators are adjusted to reach this point, individual readings of the displacement between the actuator rod and the actuator body are taken with full hydraulic fluid in the chambers. The displacement signals of the individual actuators are stored in the ECU 96. The resultant individual actuator displacement signals are considered the synchronized set point for the signals. It should be apparent to those skilled in the art that the use of placing the tools at the plane of the soil is but one of a number of reference points that define a unitary plane used in defining the reference plane.

The tillage implement is then in a position to have each of the actuators raise and lower the individual frame elements in unison to provide a uniform height above the ground and a uniform depth when the gangs of disk blades 50 are positioned in the soil. Periodically during the operation of the tillage implement, the readings of the individual actuators are determined and, if they deviate from the set point initially established, the hydraulic control system provides appropriate hydraulic fluid to achieve the same set point. This is done independently of the other actuators so that correction is applied individually to each actuator unit. The tillage implement 14 is then able to provide accurate depth of penetration among the gangs of disk harrows 50.

The implement may be adjusted additionally in the field. In this procedure, the operator prepares a test run into the soil in a field and then measures the depth of the penetration of the disk blades. To the extent that it is necessary to make a minor adjustment, the individual cylinder that is out of sync with the remaining cylinders is adjusted and a new set point is established as the level uniform plane. This ensures that field conditions such as wheel loading and other factors have a minimal and easily correctable impact on the tillage operation.

In addition, the actuators are corrected for the differential rate of displacement change by the $\Delta D/\Delta T$ so that the entry of the gangs of disk blades 50 is uniform at the beginning of the field and the withdrawal is uniform at the end of the field. The process of recalibration may be made automatic so that it does not interfere with the immediate operator directed tillage over a field and preparing the soil.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural implement spanning a lateral distance relative to a forward direction, said implement comprising:
   a plurality of carrier frames, each for supporting a plurality of soil engaging tools;
   at least one supporting element carried by each carrier frame for variably positioning the carrier frame relative to the soil;
   an actuator having a base and a variably extending elongated element connected between said each supporting element and said respective carrier frame for varying the position of said respective carrier frame relative to the soil;
   a sensor determining the displacement of the respective carrier frame relative to the soil at said at least one supporting element;
   an actuator control unit for each actuator to move said actuator independently in response to a signal input; and
   an electronic control unit (ECU) establishing a desired synchronized reference signal and comparing it to the signal from each said sensor to send a resultant signal to said actuator control unit for individually varying the position of each elongated element to reach the synchronized reference signal.

2. The agricultural implement of claim 1, in which the sensor determines the displacement of the elongated element relative to the base of each of said actuator.

3. The agricultural implement of claim 1, in which each actuator is hydraulic.

4. The agricultural implement of claim 3, wherein each actuator has a piston and a rod extending from the piston to provide the variably extending elongated element, said each actuator being hydraulically connected to said actuator control unit.

5. The agricultural implement of claim 4, further comprising a hydraulic pump for pressurizing hydraulic fluid and delivering it to said actuator control unit.

6. The agricultural implement of claim 5, in which the ECU controls said actuator control units.

7. The agricultural implement of claim 4, in which the displacement sensor connects between actuator body and said rod to provide said displacement readings.

8. The agricultural implement of claim 1, in which the variable positioning components are wheel assemblies pivotally connected to said carrier frames for varying the distance of said carrier frames relative to the soil.

9. The agricultural implement of claim 1, in which there is a pivotal connection between the plurality of carrier frames.

10. The agricultural implement of claim 9, having a center section with a pair of wheels supporting said carrier frame and at least one pair of outer carrier frames each being supported by a wheel assembly.

11. The agricultural implement of claim 1, in which the tools are gangs of disk blades for tilling the soil.

12. The agricultural implement of claim 1, in which the ECU controls the rate of displacement for each individual actuator.

13. The agricultural implement of claim 1, in which the desired synchronized reference signal is established using a flat reference plane on which the agricultural implement is placed.

14. The agricultural implement of claim 3, wherein at least a portion of the actuators are hydraulically connected in series but able to be independently controlled.

15. A method of leveling an agricultural implement relative to the soil, said agricultural implement including a plurality of articulated carrier frames, each for supporting a plurality of soil engaging tools, at least one supporting element carried by the carrier for variably positioning the carrier frame relative to the soil and an actuator for each supporting element, the actuator having a base and variably elongated element connected between the supporting elements and the carrier frame for setting the position of the carrier frame relative to the soil, the method comprising the steps of:
  determining a synchronized set point for displacement of each carrier frame relative to the soil at said supporting element;
  individually determining the displacement of the elongated element relative to the base of said sensor;
  comparing the synchronized set point and the actual displacement of said actuator to apply individually a correcting signal to level said carrier frame.

16. The method of claim 15, wherein said reference plane where each of the tools touch is a flat reference surface.

17. The method of claim 15, in which the actuators are hydraulic and all air is expelled from the actuator control system and actuator before taking the step of determining the synchronized reference plane.

18. The method of claim 15, in which the agricultural implement has a center section and at least a pair of carrier frames pivotally connected to the center section.

19. The method of claim 15, in which the variable positioning of the carrier frames is through wheel assemblies pivotally connected to said carrier frame and acted on by said actuators to variably position the carrier frames.

20. The method of claim 19, in which the actuators are hydraulic.

* * * * *